(12) United States Patent
Hessenberger et al.

(10) Patent No.: US 10,476,350 B2
(45) Date of Patent: Nov. 12, 2019

(54) ELECTRIC MOTOR FOR A POWER TOOL

(71) Applicant: MILWAUKEE ELECTRIC TOOL CORPORATION, Brookfield, WI (US)

(72) Inventors: Jeffery C. Hessenberger, Neosho, WI (US); Michael Kolden, Wauwatosa, WI (US); Andrew T. Beyerl, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 327 days.

(21) Appl. No.: 15/676,214

(22) Filed: Aug. 14, 2017

(65) Prior Publication Data

US 2017/0346364 A1 Nov. 30, 2017

Related U.S. Application Data

(63) Continuation of application No. 14/072,023, filed on Nov. 5, 2013, now abandoned.
(Continued)

(51) Int. Cl.
*H02K 7/14* (2006.01)
*B25F 5/00* (2006.01)
(Continued)

(52) U.S. Cl.
CPC ............ *H02K 7/145* (2013.01); *B25F 5/006* (2013.01); *H02K 7/04* (2013.01); *H02K 9/06* (2013.01)

(58) Field of Classification Search
CPC . H02K 7/145; H02K 7/04; H02K 9/06; B25F 5/006
(Continued)

(56) References Cited

U.S. PATENT DOCUMENTS 2,011,495 A * 8/1935 Leflar ...................... H02K 7/04
310/51
2,277,095 A * 3/1942 Fleischmann .......... H02K 7/145
310/50
(Continued)

FOREIGN PATENT DOCUMENTS

CN 2922246 7/2007
CN 101440822 5/2009
(Continued)

OTHER PUBLICATIONS

English Translation of First Office Action for Chinese Application No. 20130664420.5 dated Nov. 17, 2015 (12 pages).
Co-pending U.S. Appl. No. 14/072,007, filed Nov. 5, 2013.

*Primary Examiner* — Nathaniel C Chukwurah
*Assistant Examiner* — Lucas E. A. Palmer
(74) *Attorney, Agent, or Firm* — Michael Best & Friedrich LLP

(57) ABSTRACT

An electric motor includes first and second balancing members coupled to an output shaft for rotation with a rotor. The first and second balancing members substantially balance a mass of the rotor about a longitudinal axis of the output shaft to reduce vibrations of the electric motor during use. The first balancing member includes a brass bushing supported on the output shaft adjacent a first face of the body of the rotor. The brass bushing includes a hole drilled into an outer circumference of the brass bushing providing a first balancing feature of the electric motor. The second balancing member includes a fan supported on the output shaft adjacent a second face of the body of the rotor. The fan includes a plurality of fins extending from a first face of the fan and a second balancing feature of material removed from a second face of the fan.

8 Claims, 7 Drawing Sheets

Related U.S. Application Data

(60) Provisional application No. 61/723,166, filed on Nov. 6, 2012.

(51) Int. Cl.
    *H02K 7/04*     (2006.01)
    *H02K 9/06*     (2006.01)

(58) Field of Classification Search
    USPC .......................................................... 173/217
    See application file for complete search history.

(56) References Cited

U.S. PATENT DOCUMENTS

| | | | | |
|---|---|---|---|---|
| 2,558,737 A * | 7/1951 | Darnell | ................. | F16F 15/324 310/51 |
| 2,972,687 A * | 2/1961 | Kohler | ................. | H02K 7/1185 310/41 |
| 3,501,835 A * | 3/1970 | Moret | ..................... | B26B 19/02 30/43.92 |
| 3,906,266 A * | 9/1975 | Cowman | ............. | B23D 47/005 310/60 R |
| 4,836,755 A * | 6/1989 | Nitsche | ................... | F04B 35/04 29/888.021 |
| 5,235,228 A * | 8/1993 | Nakanura | ............... | F16F 15/30 310/168 |
| 5,329,199 A * | 7/1994 | Yockey | .................. | H02K 1/243 310/263 |
| 5,367,909 A * | 11/1994 | Heilman | ................. | F16F 15/32 180/381 |
| 5,386,163 A * | 1/1995 | Heilman | ................. | F16F 15/28 310/51 |
| 5,538,067 A * | 7/1996 | Nakamura | ......... | H02K 15/0012 164/112 |
| 5,572,787 A * | 11/1996 | Cardini | ................. | H02K 15/09 29/593 |
| 5,937,930 A * | 8/1999 | Nakamura | ......... | B22D 19/0054 164/112 |
| 6,226,857 B1 * | 5/2001 | Becherucci | ............. | H02K 7/04 29/564.6 |
| 6,477,763 B1 * | 11/2002 | Santander | ............... | H02K 3/12 156/172 |
| 6,680,553 B1 * | 1/2004 | Takano | .................... | H02K 3/50 310/156.05 |
| 6,713,916 B1 * | 3/2004 | Williams | ................. | H02K 5/00 310/58 |
| 7,091,635 B1 * | 8/2006 | Gilliland | ................. | F04D 29/282 310/62 |
| 7,107,944 B1 * | 9/2006 | Heinzen | ................. | B25F 5/006 123/46 SC |
| 7,786,628 B2 * | 8/2010 | Childe | ..................... | A47L 5/22 310/51 |
| 8,111,472 B2 * | 2/2012 | Janicek | ................. | G02B 26/008 359/889 |
| 8,251,674 B1 * | 8/2012 | Pairaktaridis | ............ | H02K 9/06 310/62 |
| 9,318,934 B2 * | 4/2016 | Duesing | ................... | H02K 5/08 |
| 2004/0056538 A1 * | 3/2004 | Du | ......................... | H01R 43/10 310/43 |
| 2005/0097724 A1 * | 5/2005 | Hodowanec | ............. | H02K 7/04 29/598 |
| 2006/0126198 A1 * | 6/2006 | Niwa | ..................... | G02B 26/008 359/892 |
| 2007/0071379 A1 * | 3/2007 | Hong | ..................... | F16C 17/26 384/276 |
| 2007/0108851 A1 * | 5/2007 | Hashiba | ............... | H02K 1/2786 310/58 |
| 2008/0019834 A1 * | 1/2008 | Matsuo | ................. | F04D 29/582 416/185 |
| 2008/0174200 A1 * | 7/2008 | Okamoto | ............... | H02K 15/02 310/216.018 |
| 2008/0224552 A1 * | 9/2008 | Ahn | ...................... | H02K 1/2786 310/61 |
| 2008/0265695 A1 * | 10/2008 | Yoshida | .................. | H02K 5/20 310/50 |
| 2009/0033160 A1 * | 2/2009 | Mueller | ................... | B60K 6/26 310/58 |
| 2009/0039995 A1 * | 2/2009 | Kipp | ................... | F16C 32/0408 335/304 |
| 2009/0169405 A1 * | 7/2009 | Suefuji | ............... | F04C 18/0215 418/55.1 |
| 2010/0209872 A1 * | 8/2010 | Kuhn | ....................... | A61C 1/06 433/131 |
| 2010/0225194 A1 * | 9/2010 | Bahadir | .................. | H02K 1/26 310/216.058 |
| 2011/0057523 A1 * | 3/2011 | Li | ........................... | H02K 1/278 310/64 |
| 2011/0067894 A1 * | 3/2011 | Bernardi | ................. | B25B 28/00 173/1 |
| 2011/0074240 A1 * | 3/2011 | Hiramatsu | ......... | H02K 15/0012 310/211 |
| 2011/0097221 A1 * | 4/2011 | Horng | ................. | F04D 25/0613 417/354 |
| 2011/0180286 A1 | 7/2011 | Oomori et al. | | |
| 2011/0227430 A1 | 9/2011 | Omori et al. | | |
| 2012/0080963 A1 * | 4/2012 | Yoshikawa | ................. | B25F 5/02 310/50 |
| 2012/0098359 A1 * | 4/2012 | Morozumi | ............... | H02K 7/04 310/51 |
| 2012/0129436 A1 * | 5/2012 | Sunazuka | ............... | B25F 5/006 451/359 |
| 2013/0076212 A1 * | 3/2013 | Park | ..................... | F04D 25/0606 310/60 R |
| 2013/0078123 A1 * | 3/2013 | Fukasaku | ............... | F04B 35/04 417/410.1 |
| 2013/0082548 A1 * | 4/2013 | Kim | ......................... | H02K 7/04 310/48 |
| 2013/0134806 A1 * | 5/2013 | Cho | ......................... | H02K 1/28 310/51 |
| 2013/0205842 A1 * | 8/2013 | Kim | ....................... | H02K 21/12 68/140 |
| 2013/0328439 A1 * | 12/2013 | Okada | ..................... | F04B 35/04 310/216.117 |
| 2013/0342045 A1 * | 12/2013 | Matsuki | ................... | H02K 5/20 310/54 |
| 2014/0091649 A1 * | 4/2014 | Dragon | ................. | H02K 1/2766 310/51 |
| 2014/0125158 A1 * | 5/2014 | Hessenberger | ......... | H02K 1/276 310/50 |
| 2015/0211548 A1 * | 7/2015 | Bang | ................... | F04D 29/5813 417/366 |
| 2016/0254715 A1 * | 9/2016 | Li | ........................... | H02K 11/21 310/68 B |
| 2016/0273536 A1 * | 9/2016 | Deguchi | ................. | F01C 21/10 |
| 2017/0250584 A1 * | 8/2017 | Lambert | ................. | H02K 1/146 |
| 2018/0111244 A1 * | 4/2018 | Blickle | ................. | B27B 19/006 |
| 2018/0138790 A1 * | 5/2018 | Fleischmann | ............ | H02K 7/04 |

FOREIGN PATENT DOCUMENTS

| | | | | |
|---|---|---|---|---|
| CN | 101832276 | | 9/2010 | |
| CN | 201839177 | | 5/2011 | |
| CN | 202475060 | | 10/2012 | |
| DE | 4315344 | | 11/1994 | |
| EP | 0911537 | | 4/1999 | |
| EP | 0911537 | A1 * | 4/1999 | ............ B25B 21/00 |
| GB | 795296 | | 5/1958 | |
| JP | 56062050 | A * | 5/1981 | ............ H02K 7/145 |
| WO | 2007051608 | | 5/2007 | |
| WO | 2011161552 | | 12/2011 | |
| WO | 2012177050 | | 12/2012 | |

\* cited by examiner

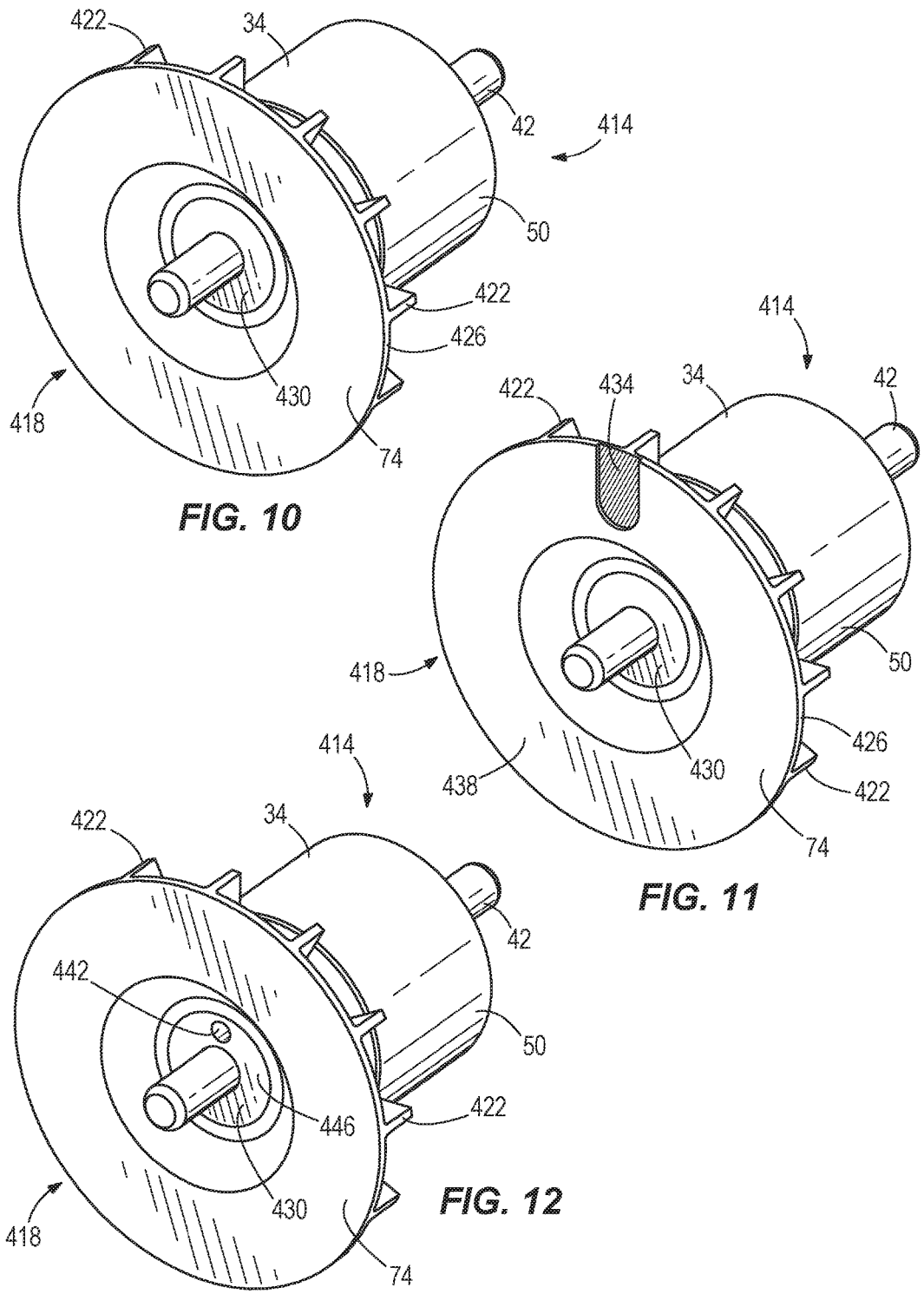

ELECTRIC MOTOR FOR A POWER TOOL

CROSS-REFERENCE TO RELATED APPLICATIONS

This application is a continuation patent application to U.S. application Ser. No. 14/072,023, filed Nov. 5, 2013, and claims priority to U.S. Provisional Patent Application No. 61/723,166, filed Nov. 6, 2012, the entire contents of which are incorporated by reference herein.

FIELD OF THE INVENTION

The present invention relates to power tools and, more particularly, to electric motors for use with power tools.

BACKGROUND OF THE INVENTION

Many power tools use electric motors, such as brushless DC motors, to drive the tools. A brushless DC motor typically includes a rotor and a stator. During operation, the rotor rotates at a relatively high speed relative to the stator. If the motor is unbalanced, the power tool may vibrate or shake during use.

SUMMARY OF THE INVENTION

In one embodiment, the invention provides an electric motor for use with a power tool. The motor includes a rotor having a body and a plurality of magnets coupled to the body, a stator having a plurality of electromagnetic coils surrounding the rotor, and an output shaft coupled to the rotor for rotation with the rotor. The output shaft defines a longitudinal axis about which the rotor rotates. The motor also includes a balancing member coupled to the output shaft for rotation with the rotor. The balancing member substantially balances a mass of the rotor about the longitudinal axis to reduce vibrations of the electric motor during use.

In another embodiment, the invention provides a power tool including a housing, a drive mechanism positioned within the housing, and an electric motor positioned within the housing and operable to drive the drive mechanism. The motor includes a rotor having a body and a plurality of magnets coupled to the body, a stator having a plurality of electromagnetic coils surrounding the rotor, and an output shaft coupled to the rotor for rotation with the rotor and coupled to the drive mechanism to drive the drive mechanism. The output shaft defines a longitudinal axis about which the rotor rotates. The motor also includes a balancing member coupled to the output shaft for rotation with the rotor. The balancing member substantially balances a mass of the rotor about the longitudinal axis to reduce vibrations of the electric motor during use.

In some embodiments, the balancing member includes at least one of a bushing having a balancing feature formed on the bushing, an overmold on the shaft having a balancing feature formed on the overmold, a bushing having a slot that receives an insert of balancing material, a fan having a balancing feature formed on the fan, and a fan having a slot that receives an insert of balancing material.

Other aspects of the invention will become apparent by consideration of the detailed description and accompanying drawings.

BRIEF DESCRIPTION OF THE DRAWINGS

FIG. 10 is a perspective view of a motor including a fan.

FIG. 11 is a perspective view of the motor and the fan of FIG. 10 with a balancing feature formed on the fan.

FIG. 12 is a perspective view of the motor and the fan of FIG. 10 with a balancing feature formed on a bushing that supports the fan.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
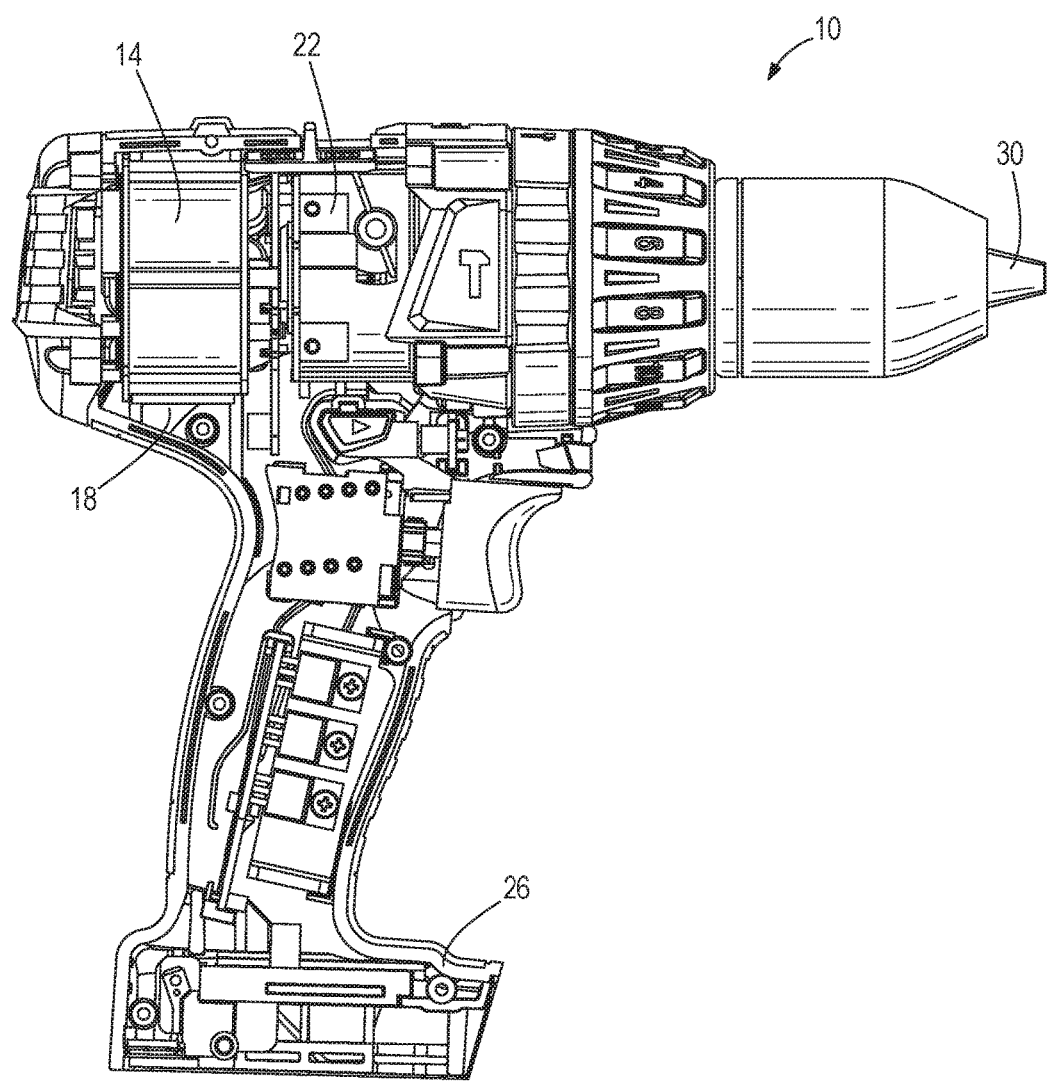
FIG. 1 is a side view of a power tool with a portion of a housing removed to show a motor.

FIG. 1 illustrates a power tool 10 including an electric motor 14, such as a brushless DC motor. In the illustrated embodiment, the power tool 10 is a hammer drill. In other embodiments, the power tool 10 may be, for example, a reciprocating saw, a circular saw, a jigsaw, a drill, an impact driver, a screwdriver, a pipe cutter, a grinder, a sander, a caulk gun, a grease gun, or the like. In further embodiments, the power tool 10 may be another type of device that uses an electric motor, such as a vacuum, a paint sprayer, lawn and garden equipment, or the like.

The motor 14 is positioned in a housing 18 of the power tool 10 and connected to a drive mechanism 22. The illustrated power tool 10 also includes a battery connection portion 26 formed on the housing 18. The battery connection portion 26 receives a battery pack to electrically couple the battery pack to the motor 14 through a switch and other electronics. The battery pack may be, for example, a 9V, 12V, 18V, 28V, or 36V Li-ion or NIMH battery pack. When powered, the electric motor 14 drives the drive mechanism 22 to operate a working element (e.g., a drill bit) connected to a chuck 30 of the power tool 10.

Figure 2:
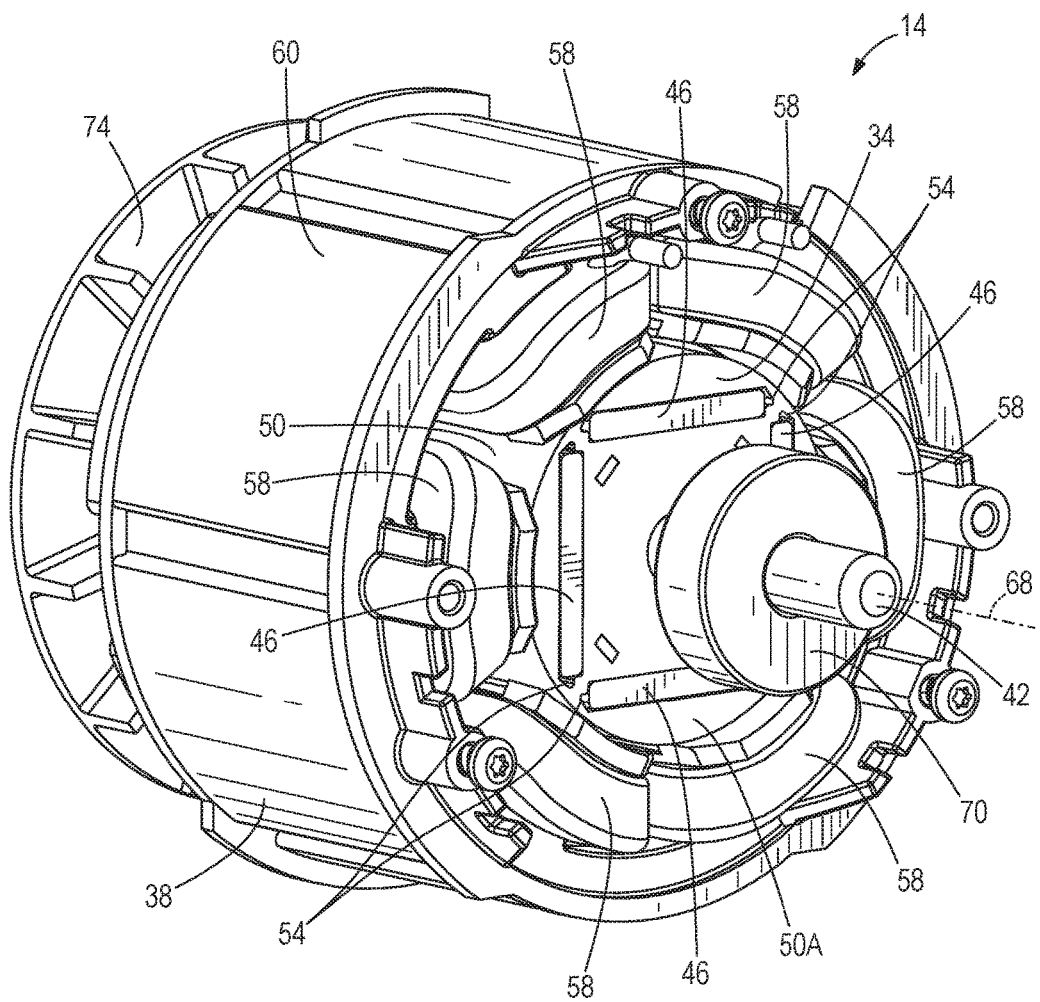
FIG. 2 is a perspective view of the motor shown in FIG. 1.

FIG. 2 illustrates the electric motor 14 in more detail. The motor 14 includes a rotor 34, a stator 38, and a motor shaft 42. The rotor 34 includes four permanent magnets 46 positioned in a body 50, or stack, of the rotor 34. The body 50 may be a laminated steel structure or powdered steel. The illustrated magnets 46 are received in corresponding slots 54 formed in the body 50 and extend between a first face 50A and a second face 50B (FIG. 5) of the body 50. The slots 54 are arranged generally perpendicular to one another in a square pattern in the body 50. The illustrated stator 38 includes six electromagnetic coils 58 surrounding the rotor 34. The coils 58 are surrounded by laminations 60 of the stator 38. When powered, the electromagnetic coils 58 create magnetic fields that interact with the permanent magnets 46 in the rotor 34 to rotate the rotor 34 relative to the stator 38. In other embodiments, the motor 14 may include fewer or more permanent magnets 46 in the rotor 34 and/or electromagnetic coils 58 in the stator 38. Although the illustrated magnets 46 are positioned within the rotor body 50 such that the magnets 46 are interior permanent magnets (IPM), in other embodiments the magnets 46 may be glued or otherwise affixed onto an outer surface of the rotor body 50 such that the magnets 46 are surface permanent magnets (SPM).

The motor shaft 42, or output shaft, extends out of the rotor 34 to rotate with the rotor 34. The shaft 42 defines a longitudinal axis 68 about which the rotor 34 rotates. The shaft 42 is fixed to the rotor 34 such that movement of the rotor 34 is transmitted to the shaft 42. In some embodiments, the shaft 42 may be fixed to the rotor 34 using suitable securing means, such as splines, knurls, press-fitting, adhesives, or the like. In other embodiments, a portion of the shaft 42 may be non-cylindrical to rotationally fix the shaft 42 to the rotor 34.

A first bearing 70 is positioned on a first end of the shaft 42 to support the shaft 42, and thereby the motor 14, within the housing 18 of the power tool 10. A fan or impeller 74 is coupled to a second end of the shaft 42 to rotate with the shaft 42 and the rotor 34. The fan 74 creates an airflow around the motor 14 to cool the motor 14 during operation of the power tool 10. A second bearing 78 (FIG. 5) is coupled to the second end of the shaft 42 adjacent the fan 74 to help support the motor 14 in the housing 18 of the power tool 10.

Figure 3:
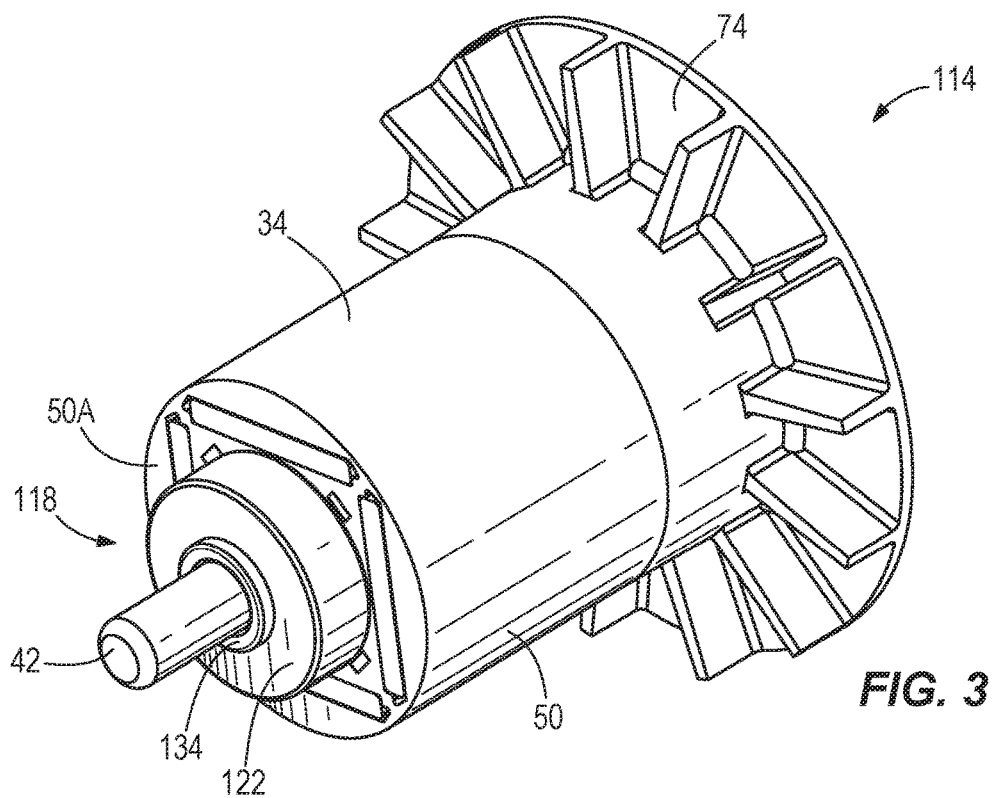
FIG. 3 is a perspective view of a motor including a bushing.
Figure 5:
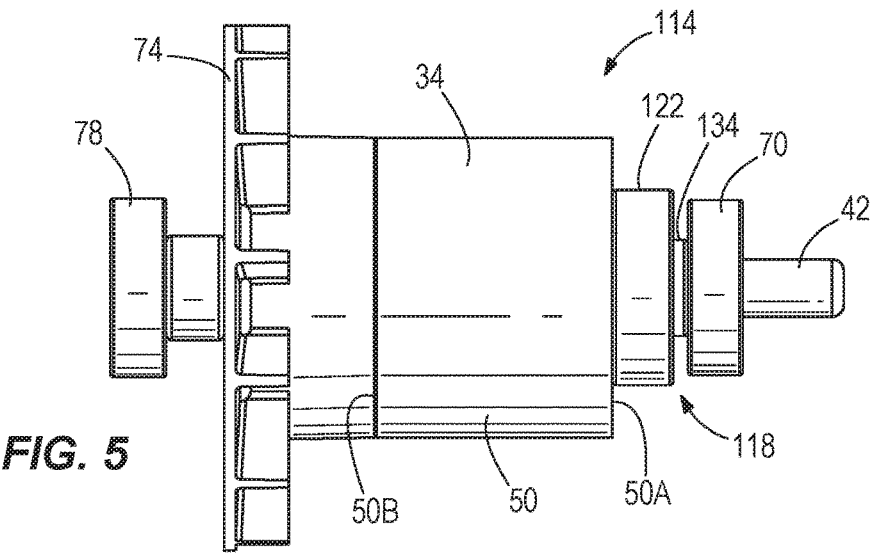
FIG. 5 is a side view of the motor and the bushing of FIG. 3.

FIG. 3 illustrates a similar motor 114 including the rotor 34, the stator (not shown), the motor shaft 42, and the fan 74. In this embodiment, the motor 114 includes a balancing member 118 comprising a bushing 122. The illustrated bushing 122 is generally cylindrical and composed of a non-magnetic, high density material such as brass. The bushing 122 is coupled to the shaft 42 between the first face 50A of the rotor body 50 and the bearing 70 (FIG. 5). The bushing 122 is fixed to the shaft 42 to rotate with the rotor 34 and the shaft 42 relative to the stator. In some embodiments, the bushing 122 may be secured to the shaft 42 by splines, knurls, press-fitting, or the like.

Figure 4:
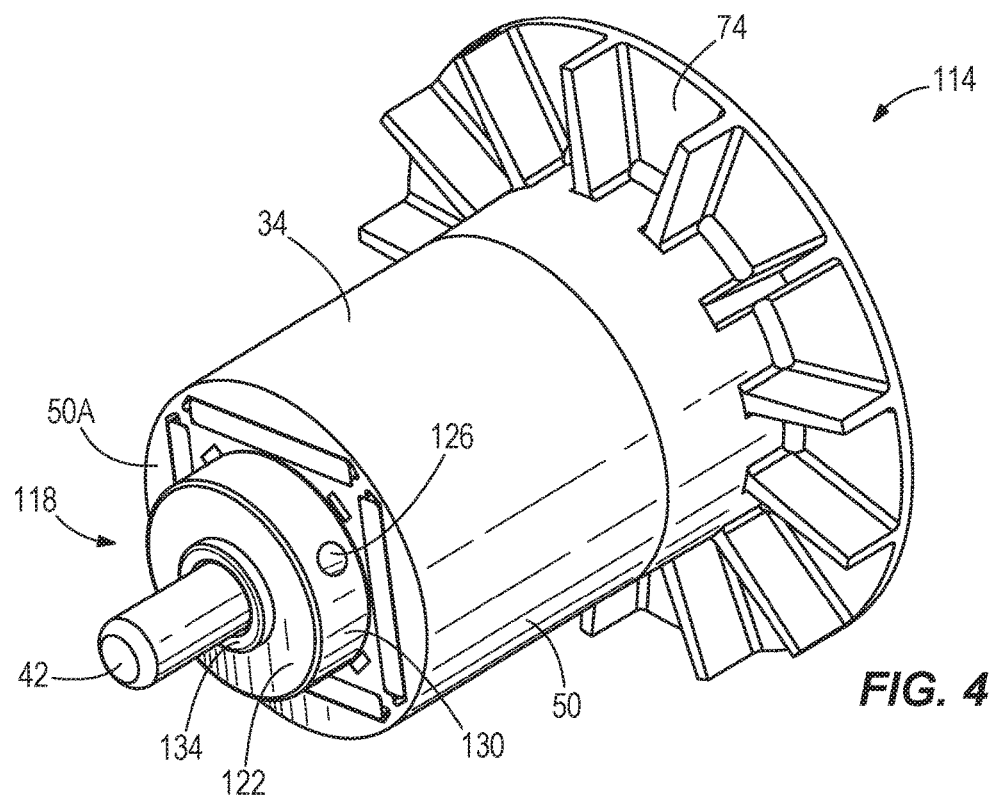
FIG. 4 is a perspective view of the motor and the bushing of FIG. 3 with a balancing feature formed on the bushing.

When the bushing 122 is assembled on the shaft 42, the bushing 122 rotates with the rotor 34 to help balance the motor 114. If the motor 114 is still imbalanced, a balancing feature 126 (FIG. 4) is formed on the bushing 122 to correct the imbalance within a predetermined specification. As shown in FIG. 4, the illustrated balancing feature 126 is machined in the bushing 122 by drilling a hole into an outer circumferential surface 130 of the bushing 122. In other embodiments, other balancing features may be formed on the bushing 122 by cutting, shaving, or otherwise removing material from the bushing 122. Additionally or alternatively, multiple balancing features may be formed on the bushing 122 to balance the motor 114 within the predetermined specification.

As shown in FIG. 5, the bushing 122 also includes a flange or step 134. The step 134 has a smaller diameter than the remainder of the bushing 122 and extends axially from the bushing 122. The step 134 engages the bearing 70 to help support the bearing 70 on the shaft 42. In particular, the step 134 supports an inner face of the bearing 70 to prevent the bearing 70 from moving along the shaft 42 toward the rotor body 50 if the power tool is dropped or during high vibration tool use. In some embodiments, the step 134 may be omitted.

Figure 6:
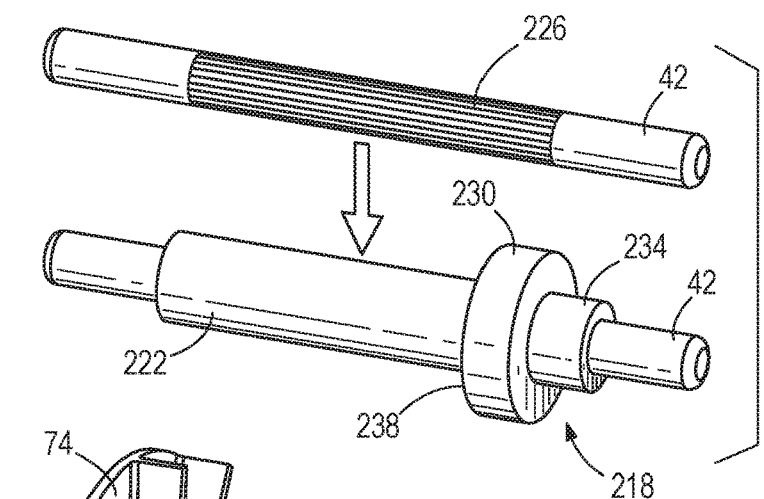
FIG. 6 is a perspective view of a motor shaft before and after the shaft is overmolded.
Figure 7:
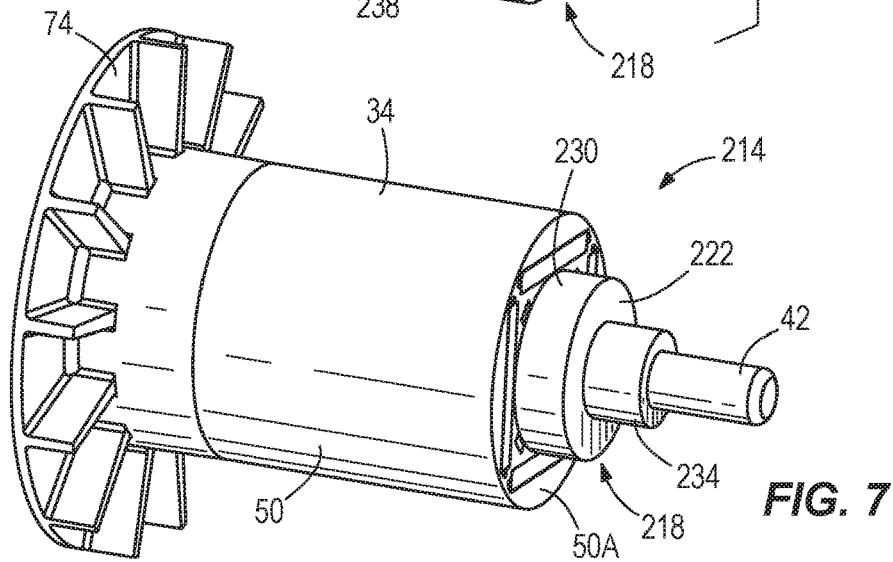
FIG. 7 is a perspective view of a motor including the overmolded shaft of FIG. 6.

FIGS. 6 and 7 illustrate another motor 214 including the rotor 34, the stator (not shown), the motor shaft 42, and the fan 74. In this embodiment, the motor 214 includes a balancing member 218 comprising an overmold 222 on the shaft 42. FIG. 6 illustrates the shaft 42 before and after the overmold 222 is applied to the shaft 42. In the illustrated embodiment, the overmold 222 is a thermoset plastic or thermoplastic material molded over a knurled surface 226 of the shaft 42. In other embodiments, other suitable materials may also or alternatively be molded over the shaft 42. In still other embodiments, the overmold 222 could be molded over the shaft 42, the magnets 46, and the rotor body 50 or over the shaft 42 and the rotor body 50.

The illustrated overmold 222 includes a radially-extending flange 230 having a larger diameter than the remainder of the overmold 222. The flange 230 is formed near, but spaced from an end of the overmold 222 adjacent a first end of the shaft 42. The flange 230 provides a hard stop for the rotor body 50. In some embodiments, the flange 230 may also provide a hard stop for the bearing (not shown) positioned on the first end of the shaft 42. In such embodiments, the bearing may be positioned on a smaller diameter section 234 of the overmold 222. In other embodiments, the smaller diameter section 234 of the overmold 222 may abut the bearing to provide the hard stop.

Referring to FIG. 7, the rotor body 50 is pressed onto the overmold 222 to fix the body 50 and the shaft 42 together. The first face 50A of the body engages an inner face 238 (FIG. 6) of the flange 230 to inhibit axial movement of the body 50 along the overmold 222. In addition, the remainder of the overmold 222 provides a press surface for laminations of the rotor body 50.

When the overmold 222 is formed on the shaft 42, the overmold 222 helps balance the motor 214. In some embodiments, one or more balancing features may be formed on the overmold 222 (particularly in the radially-extending flange 230 of the overmold 222) to help correct any imbalances of the motor 214. For example, material may be cut, drilled, shaved or otherwise removed from the overmold 222 to balance the motor 214 within the predetermined specification.

In some embodiments, the balancing member 218 may also include a balance washer or bushing coupled to the overmold 222. The balance washer may be insert molded into the overmold 222 or may be assembled onto the overmold 222 (e.g., over the smaller diameter section 234 of the overmold 222 adjacent the first end of the shaft 42). In further embodiments, one or more balancing features may also or alternatively be formed in the washer to help balance the motor 214.

Figure 8:
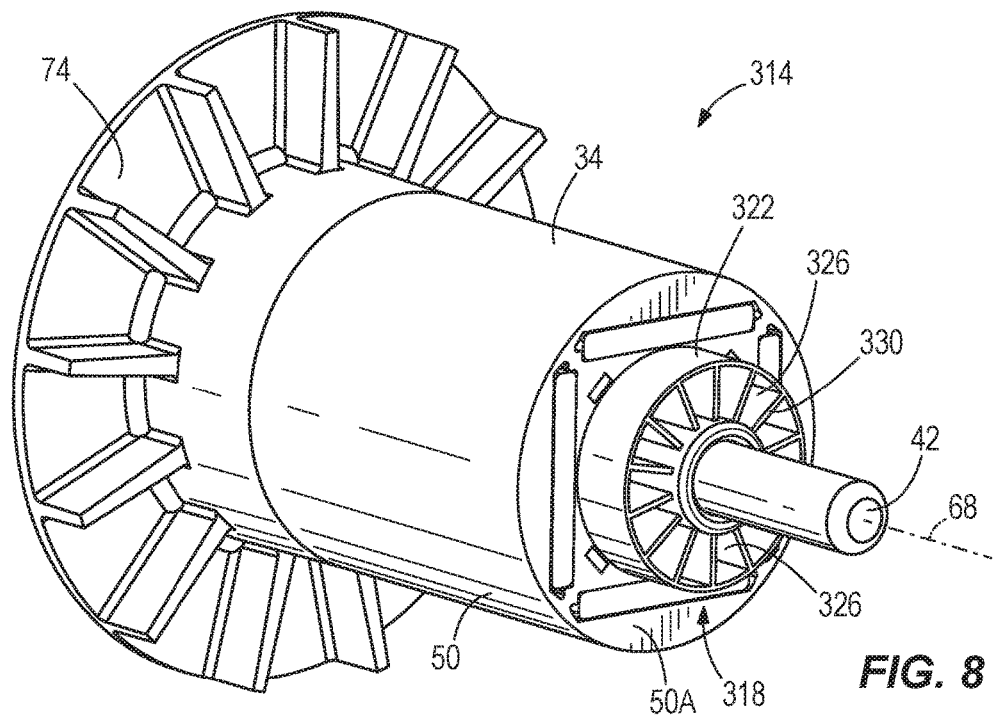
FIG. 8 is a perspective view of a motor including a bushing with slots.

FIG. 8 illustrates another motor 314 including the rotor 34, the stator (not shown), the motor shaft 42, and the fan 74. In this embodiment, the motor 314 includes a balancing member 318 comprising a slotted bushing 322. The illustrated bushing 322 is generally cylindrical and composed of a non-magnetic material such as brass or plastic. The bushing 322 is coupled to the shaft 42 between the first face 50A of the rotor body 50 and the bearing (not shown). The bushing 322 is fixed to the shaft 42 to rotate with the rotor 34 and the shaft 42 relative to the stator. In some embodiments, the bushing 322 may be secured to the shaft 42 by splines, knurls, press-fitting, or the like.

In the illustrated embodiment, the bushing 322 includes wedge-shaped openings or slots 326 extending through the bushing 322. The illustrated bushing 322 includes fourteen slots 326 formed in a face of the bushing 322 and arranged circumferentially about the longitudinal axis 68. In other embodiments, the bushing 322 may include fewer or more slots 326. The slots 326 are separated by radially-extending sidewalls 330 such that each slot 326 is discrete from adjacent slots 326.

Figure 9:
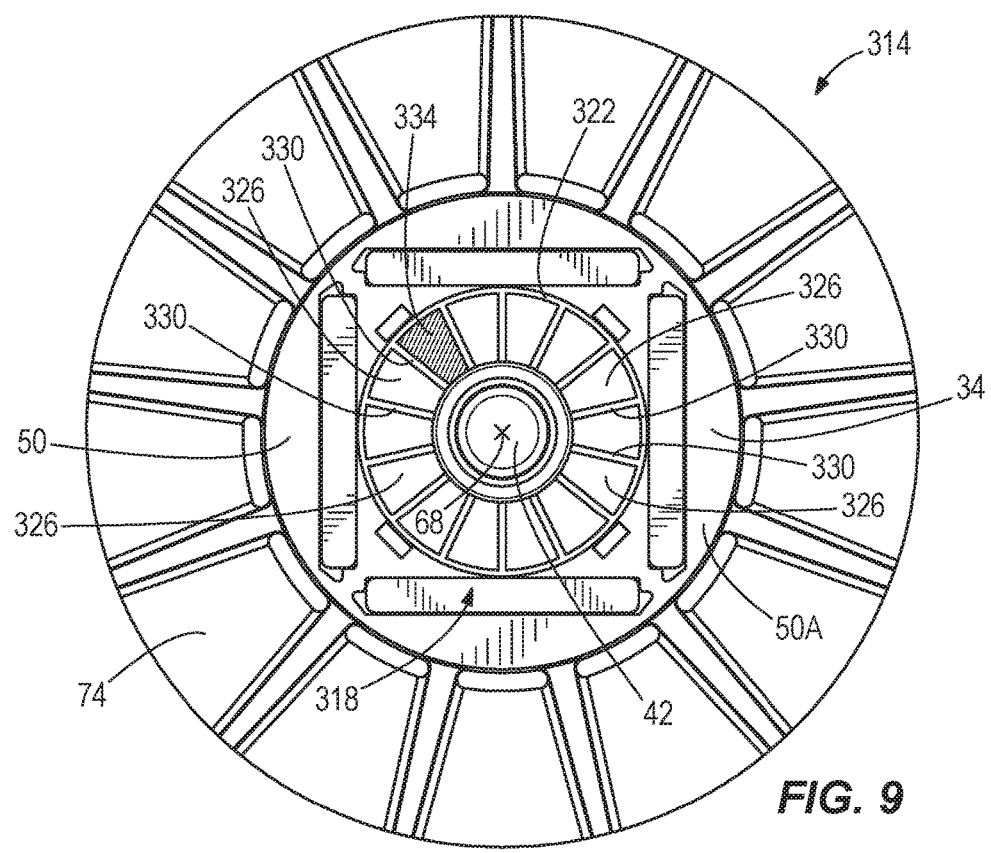
FIG. 9 is an end view of the motor and the bushing of FIG. 8.

As shown in FIG. 9, a wedge-shaped insert 334 of balancing material is positioned within one of the slots 326 of the bushing 322. In some embodiments, the balancing material is a putty or soft epoxy that hardens and sets in the slot 326. In other embodiments, the insert 334 may be a separate piece that is shaped to generally match the shape of the slots 326 and is held in the corresponding slot 326 by press-fitting and/or adhesives. When positioned in the slot 326, the insert 334 is captured between the first face 50A of the rotor 34 and the bearing to inhibit the insert 334 from sliding out of the bushing 322. The bushing 322 and the insert 334 help correct imbalances in the motor 314 when the rotor 34 rotates relative to the stator. Although only one insert 334 is shown in one slot 326 of the bushing 322, it should be readily apparent that multiple inserts 334 may be positioned in multiple slots 326 to help balance the motor 314 within the predetermined specification.

In other embodiments, the slots 326 may be formed in an overmold covering the motor shaft 42, such as the overmold 222 shown in FIGS. 6 and 7. In such embodiments, the inserts 334 of balancing material may be positioned directly in the overmold, rather than in the bushing 322. The bushing 322 may therefore be omitted or may be used in combination with the overmold.

FIG. 10 illustrates another motor 414 including the rotor 34, the stator (not shown), the motor shaft 42, and the fan 74. In this embodiment, the motor 414 includes a balancing member 418 comprising the fan 74. As discussed above, the fan 74 rotates with the rotor 34 and the shaft 42 to create an airflow for cooling the motor 414 during operation. Blades or fins 422 extend from a first face 426 of the fan 74 to generate the airflow. In the illustrated embodiment, the fan 74 is seated on a bushing 430 that surrounds a portion of the shaft 42 adjacent the second face 50B of the rotor body 50. In some embodiments, the bushing 430 may be part of an overmold formed on the shaft 42, such as the overmold 222 shown in FIGS. 6 and 7.

As shown in FIG. 11, a balancing feature 434 is formed on a second face 438 of the fan 74 opposite the fins 422. The balancing feature 434 helps balance the motor 414 within the predetermined specification. In the illustrated embodiment, the balancing feature 434 is machined in the fan 74 by cutting material off of the second face 438 of the fan 74. In other embodiments, other balancing features may be formed on the fan 74 by drilling, shaving, or otherwise removing material from the fan 74. Additionally or alternatively, multiple balancing features 434 may be formed on the fan 74 to balance the motor 414 within the predetermined specification.

As shown in FIG. 12, a balancing feature 442 is formed on an outer face 446 of the bushing 430. The balancing feature 442 helps balance the motor 414 within the predetermined specification. In the illustrated embodiment, the balancing feature 442 is machined in the bushing 430 by drilling a hole into the outer face 446 of the bushing 430. In other embodiments, other balancing features may be formed on the bushing 430 by cutting, shaving, or otherwise removing material from the bushing 430. Additionally or alternatively, multiple balancing features 442 may be formed on the bushing 430 to balance the motor 414 within the predetermined specification. In further embodiments, balancing features may be formed on both the fan 74 and the bushing 430 to help balance the motor 414.

Figure 13:
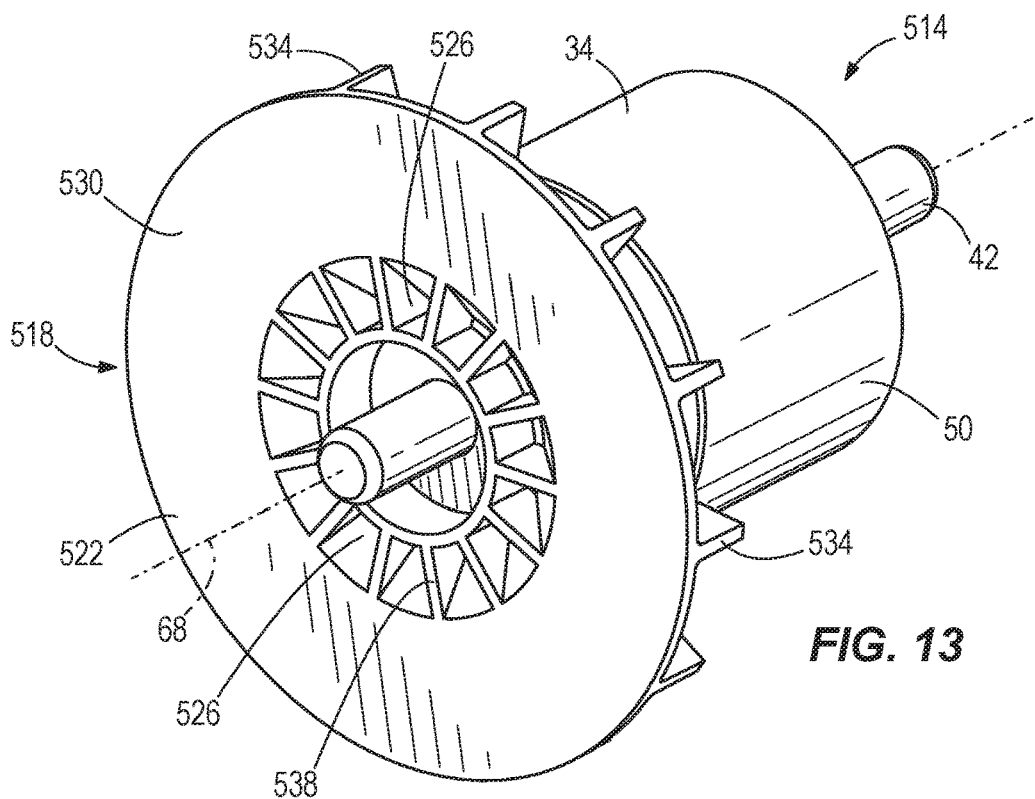
FIG. 13 is a perspective view of a motor including a fan with slots.

FIG. 13 illustrates another motor 514 including the rotor 34, the stator (not shown), and the motor shaft 42. In this embodiment, the motor 514 includes a balancing member 518 comprising a slotted fan 522. The illustrated fan 522 is similar to the fan 74 discussed above, but also includes wedge-shaped openings or slots 526. The slots 526 are formed in a face 530 of the fan 522 opposite from fins 534 of the fan 522. In the illustrated embodiment, the slots 526 are formed in an inner radial portion of the face 530. In other embodiments, the slots 526 may be formed in an outer radial portion of the face 530. The illustrated fan 522 includes fourteen slots formed in the face 530 of the fan 522 and arranged circumferentially about the longitudinal axis 68. In other embodiments, the fan 522 may include fewer or more slots 526. The slots 526 are separated by radially-extending sidewalls 538 such that each slot 526 is discrete from adjacent slots 526.

Figure 14:
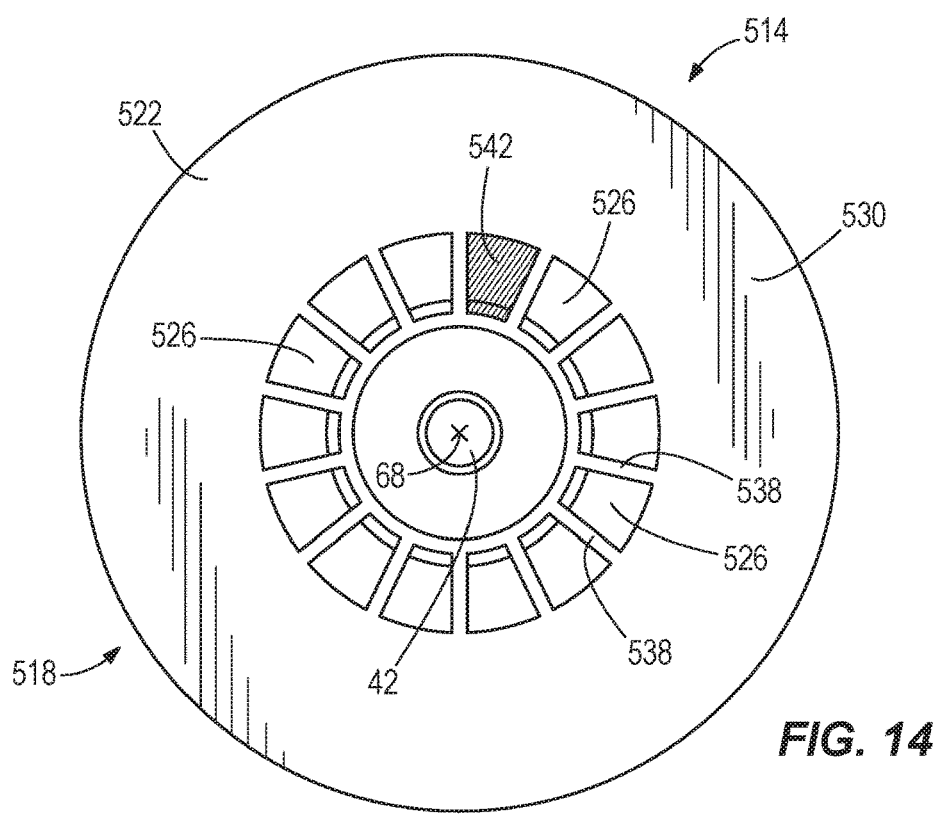
FIG. 14 is an end view of the motor and the fan of FIG. 13.

As shown in FIG. 14, a wedge-shaped insert 542 of balancing material is positioned within one of the slots 526 of the fan 522. In some embodiments, the balancing material is a putty or soft epoxy that hardens and sets in the slot 526. In other embodiments, the insert 542 may be a separate piece that is shaped to generally match the shape of the slots 526 and is held in the corresponding slot 526 by press-fitting and/or adhesives. The insert 542 helps correct imbalances in the motor 514 when the rotor 34 rotates relative to the stator. Although only one insert 542 is shown in one slot 526 of the fan 522, it should be readily apparent that multiple inserts 542 may be positioned in multiple slots 526 to help balance the motor 514 within the predetermined specification.

The balancing members 118, 218, 318, 418, 518 discussed above help balance an electric motor in a power tool, or other device, within a predetermined specification to reduce vibration of the motor during use. In particular, the balancing members 118, 218, 318, 418, 518 balance masses of the corresponding rotors about the longitudinal axis of the motors (e.g., about the longitudinal axis 68) to reduce vibrations of the motors compared to motors without balancing members. Although each of the balancing members 118, 218, 318, 418, 518 has been described separately, a single motor may include a combination of two or more of the balancing members 118, 218, 318, 418, 518 to achieve the desired balance.

Although the invention has been described with reference to certain preferred embodiments, variations and modifications exist within the scope and spirit of one or more independent aspects of the invention as described.

What is claimed is:

1. An electric motor for the use with a power tool, the electric motor comprising:
  a rotor including a body and a plurality of magnets coupled to the body;
  a stator including a plurality of electromagnetic coils surrounding the rotor;
  an output shaft coupled to the rotor for rotation with the rotor, the output shaft defining a longitudinal axis about which the rotor rotates; and
  first and second balancing members coupled to the output shaft for rotation with the rotor, the first and second balancing members substantially balancing a mass of the rotor about the longitudinal axis to reduce vibrations of the electric motor during use;
  wherein the first balancing member includes a brass bushing supported on the output shaft adjacent a first face of the body of the rotor, the brass bushing including a hole drilled into an outer circumference of the brass bushing providing a first balancing feature of the electric motor; and wherein the second balancing member includes a fan supported on the output shaft adjacent a second face of the body of the rotor, the fan including a plurality of fins extending from a first face of the fan and a second balancing feature of material removed from a second face of the fan.

2. The electric motor of claim 1, further comprising a bearing supported on the output shaft, wherein the first balancing member is located between the first face of the body of the rotor and the bearing.

3. The electric motor of claim 1, wherein the first balancing feature is formed on the brass bushing after the brass bushing is assembled on the output shaft.

4. The electric motor of claim 1, wherein the fan is supported on a second bushing that surrounds a portion of the output shaft adjacent the second face of the body of the rotor.

5. A power tool comprising:
a housing;
a drive mechanism positioned within the housing; and
an electric motor positioned within the housing and operable to drive the drive mechanism, the motor including
a rotor including a body and a plurality of magnets coupled to the body,
a stator including a plurality of electromagnetic coils surrounding the rotor,
an output shaft coupled to the rotor for rotation with the rotor and coupled to the drive mechanism to drive the drive mechanism, the output shaft defining a longitudinal axis about which the rotor rotates, and
first and second balancing members coupled to the output shaft for rotation with the rotor, the first and second balancing members substantially balancing a mass of the rotor about the longitudinal axis to reduce vibrations of the electric motor during use;
wherein the first balancing member includes a brass bushing supported on the output shaft adjacent a first face of the body of the rotor, the brass bushing including a hole drilled into an outer circumference of the brass bushing providing a first balancing feature of the electric motor; and
wherein the second balancing member includes a fan supported on the output shaft adjacent a second face of the body of the rotor, the fan including a plurality of fins extending from a first face of the fan and a second balancing feature of material removed from a second face of the fan.

6. The power tool of claim 5, wherein the motor further includes a bearing supported on the output shaft, and wherein the first balancing member is located between the first face of the body of the rotor and the bearing.

7. The power tool of claim 5, wherein the first balancing feature is formed on the brass bushing after the brass bushing is assembled on the output shaft.

8. The power tool of claim 5, wherein the fan is supported on a second bushing that surrounds a portion of the output shaft adjacent the second face of the body of the rotor.

\* \* \* \* \*